Figure 1:
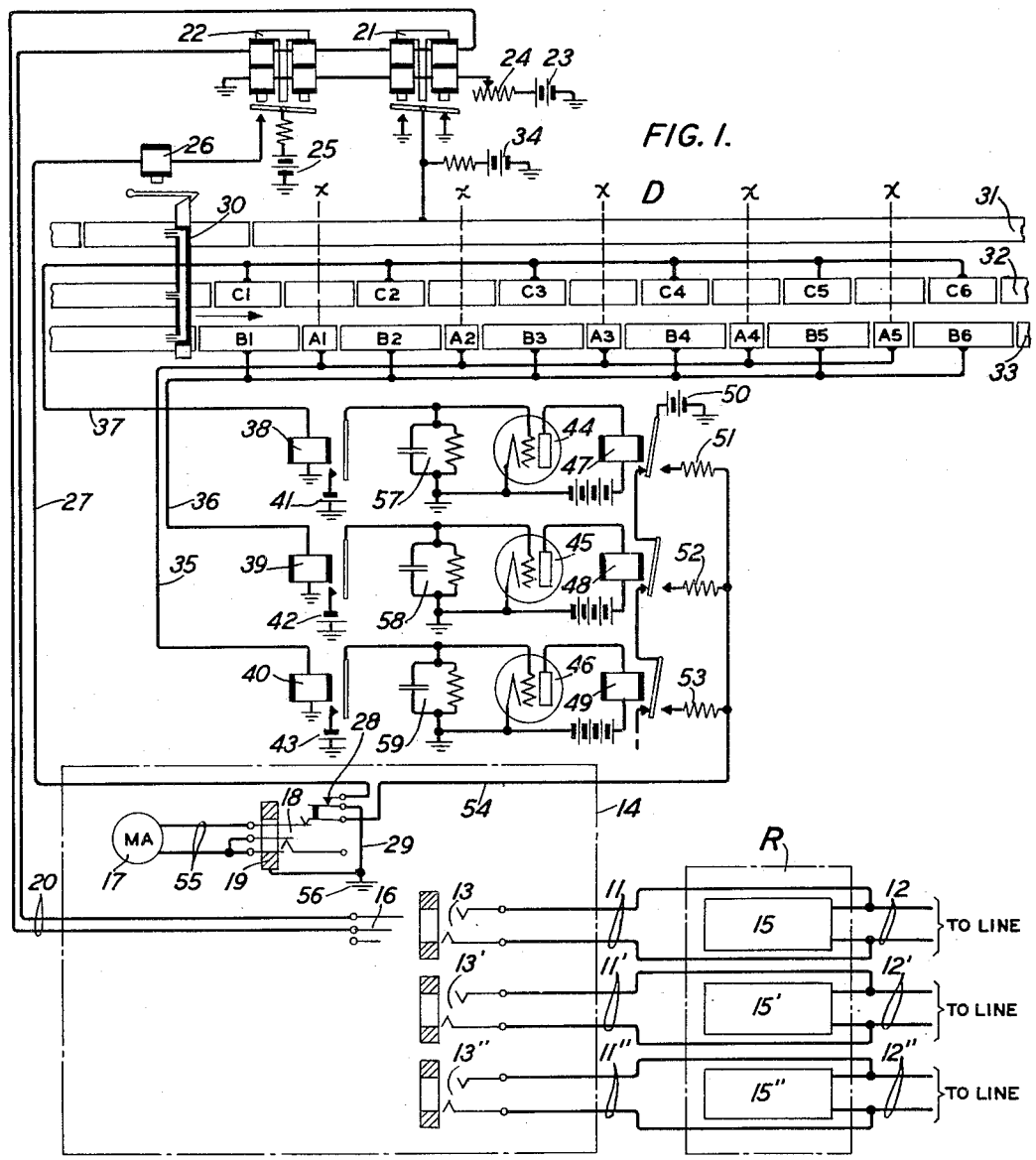

Aug. 1, 1933.   A. WEAVER   1,920,454
SIGNAL DISTORTION INDICATING DEVICE
Filed April 21, 1931

INVENTOR
A. WEAVER
BY
ATTORNEY

Patented Aug. 1, 1933

1,920,454

UNITED STATES PATENT OFFICE 1,920,454

SIGNAL DISTORTION INDICATING DEVICE

Allan Weaver, Port Washington, N. Y., assignor to American Telephone and Telegraph Company, a Corporation of New York Application April 21, 1931. Serial No. 531,768

8 Claims. (Cl. 178—69)

This invention relates to electrical measuring systems and particularly to means for determining the existence and magnitude of distortion of telegraph signaling impulses produced in the course of transmitting the impulses.

In the transmitted telegraph signals, each made up of a plurality of impulses and each impulse having a definite length, distortion of the impulse and therefore of the signal, may be produced by various causes inherent in the line or in the apparatus connected therewith or both. The distortion with which this invention is concerned manifests itself in lengthening or shortening the impulses which constitute the signals transmitted over the line. This lengthening or shortening of the impulses interferes with the proper recordation of the signals at any station connected to the line and, consequently, impairs the efficiency of transmission.

Frequently, printers have been employed for monitoring purposes in telegraph offices. These printers were employed for communicating with subscribers and repeater stations, measuring orientation margins either in connection with routine tests of working circuits and when locating reported trouble. There has also been devised a distortion measuring device wherein there is eliminated the necessity of a printer for monitoring purposes. Such a device is disclosed in Patent No. 1,871,916, granted Aug. 16, 1932, to R. E. Pierce, Serial No. 478,745, filed August 29, 1930, wherein two line relays and the receiving part of a start-stop distributor are used in combination with a loud speaker arrangement which affords an audible indication whenever the orientation setting of the distributor ring is such that the armatures of the line relays reverse their positions while the distributor brush is on any one of the five selecting segments of the distributor. The selecting segments are those corresponding to the segments that would be connected to the selecting magnets of a printer if one were to be used. The operation of the loud speaker is used in obtaining orientation limits in the usual way so that substantially the same results may be secured as if the attendant were measuring the orientation margin while observing the printed copy or tape with the printer set. It has also been the practice in telegraph systems to provide circuits for determining the existence and magnitude of distortion wherein a distortion indicating instrument is made to respond to a special predetermined combination of impulses, which arrangement makes it necessary to disconnect a line circuit from service in order to test it.

An object of this invention is to determine in a simple, efficient and economical manner the existence and magnitude of lengthening or shortening of signals incoming at a repeater or a receiving station.

This object, more specifically stated, is to indicate by means of a measuring device, such as a milliammeter, the magnitude of the distortion without resorting to orientation of a distributor ring to obtain this information.

Another object is to utilize the incoming message signal impulses themselves for operating the distortion indicating instrument whereby the circuit being tested may be maintained in continuous use for transmitting messages while it is being tested.

According to the present invention the presence and magnitude of the distortion is determined directly by a milliammeter without the use of monitoring printers and without resorting to the orientation of the monitor distributor ring. With this invention an arrangement is provided whereby the total distortion on a working printer circuit within certain predetermined limits may be read directly on a meter without any manual manipulation of the monitoring distributor.

The system whereby this result is accomplished comprises, in one embodiment, a plurality of indicating circuits and a specially constructed distributor connected thereto whereby one of said circuits corresponding to the magnitude of the distortion present is selected and caused to give an indication according to the magnitude of the distortion of the impulses arising at the particular instant of time under consideration.

Figure 2:
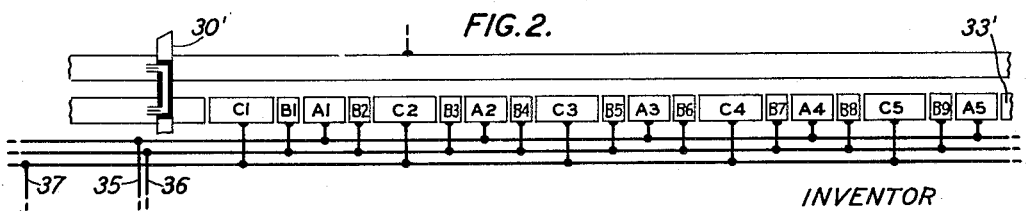

Other objects and features will appear in the following detailed specification and appended claims when taken in conjunction with the accompanying drawing of which:

Figure 1 illustrates an embodiment of the invention wherein the monitoring distributor is provided with three segmented rings; and Fig. 2 shows a modification of the distributor of Fig. 1 wherein the distributor comprises only two segmented rings.

Like parts are designated by like reference characters.

Referring to Fig. 1 loop circuits 11, 11', 11", etc. are respectively connected in series with incoming lines circuits, 12, 12', 12", etc. at a repeater or a receiving station in a telegraph system designed to transmit signal combinations of "current" and "no current" impulses. Loop circuit 11 includes a spring jack 13 located in the face of a test board represented diagrammatically by block 14. Other spring jacks 13′, 13″, etc. are provided in the face of test board 14 for line circuits 12′, 12″, etc., which may extend to a plurality of distant stations. The loop circuits are connected to the line circuits in parallel with the receiving equipment R shown diagrammatically by blocks 15, 15′, 15″, etc., whereby the line signals may be received at the test board. The test board 14 is equipped with a plug 16 which is connected to the input side of a test circuit shown above the test board in the drawing and which is adapted for insertion in any one of the loop circuit jacks 13, 13′, 13″, etc. It is also equipped with a meter 17 and a meter circuit plug 18 adapted for insertion in a test jack 19 which is connected to the output side of the test circuit whereby the magnitude of distortion in the incoming signal is indicated by the deflection of the needle on the meter.

The loop circuit which is assumed herein to be selected for testing by means of plug 16 is connected to the test circuit which includes conductors 20 and a pair of biased polarized relays 21 and 22 each of which is equipped with two windings. The upper windings of the two relays are connected in series and are energized to hold their respective armatures in the positions shown as soon as plug 16 is inserted in one of the jacks 13, 13′, 13″, etc., because the loop circuits are connected to incoming lines which are assumed herein to be normally closed and normally energized. The lower windings are connected in a continuously closed circuit comprising a biasing battery 23 and a regulating resistance 24. The line current normally flowing through the upper windings of the relays flows in a direction opposite to that flowing through the lower windings and is of such strength as to predominate over the latter. The biasing current flowing through the lower windings is regulated by resistance 24 and is therefore made to be of sufficient strength to operate the relays every time the line or loop circuit is opened.

The operation of relay 22 in response to a "no current" or "open" impulse from a distant station causes the armature of relay 22 to engage its left-hand contact and thereby to close a circuit extending from the positive pole of grounded battery 25, armature and left-hand contact of relay 22, through the winding of release magnet 26, conductor 27, contact 28 closed by the insertion of plug 18 into jack 19, strap 29 to ground. Magnet 26 operates and thereby releases brush 30 which starts to rotate in the direction indicated by the arrow over the distributor D.

The distributor D is of the start-stop type used in receiving apparatus of start-stop printing telegraph systems. Brush 30 which is normally restrained from moving by the latch under the control of release magnet 26, is driven by a constant speed motor through a friction clutch, neither of which is shown but which are well understood in the art. The distributor comprises three concentric segmented rings 31, 32 and 33, which are shown here as developed for the purpose of illustration. The inner ring 31 is constituted of one long and one short segment, the short segment which is engaged by brush 30 in its normal position being left "dead" and the long segment being connected to the positive pole of grounded battery 34. The outer ring 33 comprises five short segments $A_1$ to $A_5$ of equal length corresponding to the signal impulses of a five-unit code, six long segments $B_1$ to $B_6$ of equal length and one dead segment which brush 30 engages when it is in its normal position. The length of segments $A_1$ to $A_5$ is determined by the amount of refinement required in indicating the distortion of the signals. In the illustration described herein the segments $A_1$ to $A_5$ are made one-quarter the length of a unit length or dot impulse and therefore allow a maximum permissible distortion of one-half a segment length which is one-eighth of a unit length or dot impulse, or 12½% distortion. Segments $A_1$ to $A_5$ are connected in multiple to conductor 35. The segments $B_1$ to $B_6$ are shown herein as each having a length three times that of one of segments $A_1$ to $A_5$ and are capable of indicating distortion of 12½% to 25%. Segments $B_1$ to $B_6$ are connected in multiple to conductor 36. The middle ring 32 comprises eleven segments each having a length twice that of one of segments $A_1$ to $A_5$ and one long segment with which brush 30 is in engagement when it is in its normal position. The alternate segments $C_1$ to $C_6$ of ring 32 are connected in multiple to conductor 37, the remaining segments being left dead. Segments $C_1$ to $C_6$ provide for indicating distortion exceeding 25%.

Incoming signals are ordinarily considered satisfactory when the distortion present therein is within the limits of zero and 12½%. If perfect signal impulses are received, brush 30 will be passing over the center line of a segment $A_1$ etc., of ring 33 at the time the impulse is received. If the brush is passing over either the front or rear edge of a segment A at this moment, the distortion present will be 12½%. If the brush is between the front edge of a segment B of ring 33 and the front edge of an adjacent segment $C_1$, $C_2$ etc. of ring 32, the distortion will be between 12½% and 25%. If the brush is on a segment $C_1$, $C_2$ etc. the distortion will be in excess of 25%.

The conductors 35, 36 and 37 are respectively connected to the windings of relays 38, 39 and 40 whereby one or more of these relays will operate depending on the position of brush 30 at the time the armature of relay 22 moves from one of its contacts to the other in response to an incoming signal impulse. It is while the armature is passing between contacts that the positive pole of grounded battery 34 is connected through the distributor D to the winding of one or more of relays 38, 39 and 40. Relays 38, 39 and 40 which are of the biased type, are selectively operated by means of brush 30 to cause a negative potential from one of the batteries 41, 42 and 43, that is, the one associated with the selected relay, to be impressed on the grid of the associated vacuum tube of tubes 44, 45 and 46. The normal space current of the selected vacuum tube which normally maintains its associated relay of relays 47, 48 and 49 operated, is blocked by the negative potential on the grid to thereby deenergize the relay associated with the selected vacuum tube circuit. Relays 47, 48 and 49 are also of the biased type and therefore the deenergized relay allows its armature to fall back into engagement with its back contact whereby a circuit is closed from grounded battery 50, through the armature and back contact of the deenergized relay, the resistance of resistances 51, 52 and 53 associated with the deenergized relay, conductor 54, the tip or middle spring of jack 19, plug 18, tip lead of conductors 55, meter 17, the sleeve lead of conductors 55, to ground 56 on the sleeve of jack 19. The resistances 51, 52 and 53 are of different values and consequently when current passes through any one of them, the needle of meter 17 will be deflected a certain amount depending on which resistance receives current. Impulse lengthening circuits 57, 58 and 59 are respectively provided across the grid circuit of vacuum tubes 44, 45 and 46 in order that the negative grid potential may be maintained sufficiently to cause the deenergization of relays 47, 48 and 49, and also to cause the meter needle to maintain its deflection for a substantial length of time.

Operation of the circuit of Fig. 1

It is assumed in the following description that information is desired regarding the magnitude of the signal distortion on the line circuit 12 which is connected to loop circuit 11. Plugs 16 and 18 are respectively inserted into jacks 13 and 19. Relays 21 and 22 operate in response to every change in the direction of current in the incoming signals, for example, the relay armatures move to their alternate or left-hand positions in response to every "no current" or "open" impulse and to their normal or right-hand positions in response to every "current" or "closed" impulse. In response to the start or spacing impulse, which in this illustration is a "no current" or "open" impulse, relays 21 and 22 operate to their alternate positions. Relay 22 closes a circuit extending from grounded battery 25, over the armature and left contact of relay 22, through the winding of release magnet 26, conductor 27, through the uppermost closed contact of jack 19 to ground 56. Magnet 26 operates and thereby releases the brush 30 which being now under the control of the friction clutch on a driving shaft (not shown) begins to rotate in the direction indicated by the arrow.

If there is no distortion present in the incoming signals, every time the armature of relay 21 moves from one contact to the other in response to a message impulse, brush 30 will be passing over the center line $x$ of a segment A. However, this refinement is not necessary for the reception of satisfactory signals. It is common practice to allow a distortion up to about 12½% of the dot impulse length and therefore it is for this purpose that in the arrangement described herein the segments A are each made one-quarter of the dot impulse length and this permits a recordation of distortion up to 12½% on either side of the center line $x$. When the armature of relay 21 begins to move at the time brush 30 is passing over segment $A_1$, current from grounded battery 34 flows in a circuit extending over ring 31, brush 30, segment $A_1$, conductor 35, through the winding of relay 40 to ground, causing relay 40 to operate. As soon as the armature of relay 21 reaches its opposite contact a short circuit for battery 34 is established and relay 40 releases. The operation of relay 40 momentarily connects grounded negative battery 43 to the grid circuit of vacuum tube 46. The grid of vacuum tube 46 is normally at zero voltage and therefore the normal space current of vacuum tube 46 is effective to normally maintain relay 49 in an operated position. The connecting of negative battery 43 to the grid of vacuum tube 46 momentarily blocks the space current and relay 49 deenergizes. The duration of time wherein the space current is blocked is prolonged by the impulse lengthener circuit 59. The deenergization of relay 49 allows the relay armature to engage its back contact and a circuit is closed extending from grounded battery 50, armatures and front contacts, in series, of relays 47 and 48, armature and back contact of relay 49, resistance element 53, conductor 54, tip spring of jack 19, plug 18, tip lead of conductors 55, meter 17, sleeve lead of conductors 55, sleeve of jack 19 to ground 56. Resistance element 53 is of such value as to provide on the meter a definite reading in milliammeters to indicate that there is at the most 12½% distortion.

If the distortion is in excess of 12½% and less than 25%, brush 30 will be passing over either the rear portion of segment $B_1$ or the front portion of segment $B_2$ at the time the armature of relay 21 starts to move to its opposite contact, and a circuit will be momentarily closed which circuit extends from grounded battery 34, ring 31, brush 30, segment $B_1$ or $B_2$, conductor 36, through relay 39 to ground. The normally energized relay 48 will subsequently be momentarily released in the manner described above for the release of relay 49, to close a circuit including resistance element 52 and meter 17. Resistance element 52 is of such value as to provide on the meter a definite reading indicating that the distortion is somewhere between 12½% and 25%.

If the distortion is in excess of 25%, brush 30 will be passing over segment $C_1$ or $C_2$ of ring 32 at the time the armature of relay 21 is moving from one contact to the other. Consequently a circuit will be closed including conductor 37 and relay 38 which circuit upon being established, causes the deenergization of relay 47 and the closing of the circuit including resistance elements 51 and meter 17. Resistance element 51 is of such value as to provide on the meter a reading, indicating distortion in excess of 25%.

The impulse lengthening circuit described above is so chosen that if a certain distortion value (say greater than 25%) recurs frequently enough, such as once every revolution of the distributor, the meter will give a steady reading.

Fig. 2 shows a distributor with rings 32 and 33 of Fig. 1 combined to form one ring 33'. It is assumed that the segments of ring 33' are designed with a view to obtaining distortion values similar to those obtained by the arrangement shown in Fig. 1, namely, 0 to 12½%, 12½% to 25% and in excess of 25%. The length of the segments of Fig. 2 will be as follows: Segments A, one dot impulse length; segments B, one half dot impulse length; and segments C, two dot impulse length.

It is understood that by varying the number of segments, vacuum tube circuits and resistance elements such as those designated 51, 52 and 53 in Fig. 1, distortion of various values may be obtained, bearing in mind, of course, that the values of all these resistance elements must be different in order to vary the readings on the meter.

What is claimed is:

1. In an impulse transmission system, a transmission line, a device for indicating and measuring the distortion of received signal impulses which manifests itself in lengthening or shortening the duration of signal impulse, comprising a plurality of circuits, means responsive to every significant change in current in the impulses received over said line for selecting one of said selective circuits, and means responsive to the selected circuits to indicate the degree of distortion present in the impulses received over the transmission line.

2. In a distortion indicating system for indicating the lengthening or shortening of discrete impulses present in a transmission line, a distributor with a common ring and a plurality of rows of segments of different fixed lengths, a path for connecting a transmission line circuit to said common ring, a plurality of indicator circuits connected respectively to each of said plurality of segments, and a brush bridging each of said rows of segments to said common ring.

3. In an impulse transmission system, a plurality of transmission lines, a device for indicating and measuring the distortion of received signals which manifests itself in lengthening or shortening the duration of signal impulses, characterized in this, that a plurality of selective circuits respectively responsive to impulses having different degrees of distortion, are provided with means for connecting them to any one of a plurality of transmission lines and that indicating means, common to the plurality of selective circuits, is provided for registering the degree of distortion in the signals received over any one of the transmission lines.

4. In an impulse transmission system, a test circuit for indicating and measuring that type of distortion in received signals which manifests itself in lengthening and shortening the duration of signal impulses, comprising a plurality of selective circuits, a rotary distributor of the start-stop type for distributing a current impulse at every change in direction of current in the received signals, to one or more of said selective circuits, and impulse relaying devices for generating said current impulses for distribution to said selective circuits, one of said devices being adapted to start, in response to the first impulse of each signal impulse combination, said rotary distributor and the other of said devices being adapted to select, in response to each of the subsequent impulses of each signal impulse combination, one or more of said selective circuits.

5. In an impulse transmission system, according to claim 4, wherein each of said selective circuits comprises a normally deenergized relay, a thermionic discharge device having an input and an output circuit, each of said relays being in its respective input circuit, a control element in said input circuit normally maintained at zero potential, and a normally operated relay in said output circuit, and means responsive to the energization of the normally deenergized relay of the first selective circuit for momentarily applying a negative potential to its associated control element to cause the release of its respective normally operated relay, means in said input circuit for prolonging the negative potential on said control element to insure the release of the normally operated relay, and a path and a source controlled by the release of the normally operated relay for energizing the indicating means, each of said paths connected to each of said normally operated relays having an energizing effect upon the indicating means different from the effect of the other paths.

6. In an impulse transmission system, a transmission line, a distortion indicating circuit having terminals for connection to said line and comprising a plurality of selecting means each respectively responsive to signal impulses having different amounts of distortion, a distortion indicating device and means arranged to control said device exclusively by the selecting means responsive to the largest amount of distortion whereby said device indicates the largest amount of distortion present in a group of signal impulses.

7. In an impulse transmission system, according to claim 6, wherein the selecting means each includes a slow-acting device whereby the distortion indicating device is caused to give a steady indication of the magnitude of distortion when certain degrees of distortion occur recurringly.

8. An impulse transmission system, a transmission line, a receiving circuit and a test circuit for simultaneously receiving signals from said transmission line, signal receiving means in said test circuit, a plurality of selective circuits, responsive to every change in direction of current of the received signals, distributing means connected intermediate said signal receiving means and said selective circuits for rendering each of said selective circuits responsive to a received signal impulse having some certain degree of distortion which is different, in degree of distortion, from another received signal impulse capable of operating another of said selective circuits, and a device connected to said selective circuits for indicating the degree of distortion.

ALLAN WEAVER.